United States Patent
Tomita et al.

(10) Patent No.: US 9,677,626 B2
(45) Date of Patent: Jun. 13, 2017

(54) SELECTABLE ONE-WAY CLUTCH

(71) Applicant: TOYOTA JIDOSHA KABUSHIKI KAISHA, Toyota-shi, Aichi-ken (JP)

(72) Inventors: Mitsuaki Tomita, Susono (JP); Hideaki Komada, Gotemba (JP); Hiroyuki Shioiri, Yokohama (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/067,372

(22) Filed: Mar. 11, 2016

(65) Prior Publication Data

US 2016/0265605 A1  Sep. 15, 2016

(30) Foreign Application Priority Data

Mar. 12, 2015 (JP) .................. 2015-049433

(51) Int. Cl.
*F16D 41/12* (2006.01)
*F16D 25/00* (2006.01)

(52) U.S. Cl.
CPC ............ *F16D 41/125* (2013.01); *F16D 25/00* (2013.01)

(58) Field of Classification Search
CPC ....... F16D 41/125; F16D 41/084; F16D 41/02
See application file for complete search history.

(56) References Cited

U.S. PATENT DOCUMENTS

| 2007/0007098 | A1  | 1/2007 | Inaba |  |
|---|---|---|---|---|
| 2008/0135369 | A1* | 6/2008 | Meier | F16D 41/125 192/107 R |
| 2008/0223681 | A1* | 9/2008 | Stevenson | B60K 6/365 192/43 |
| 2014/0116832 | A1* | 5/2014 | Beiser | F16D 41/125 192/54.1 |

FOREIGN PATENT DOCUMENTS

| JP | 2003-021220 A | 1/2003 |
| JP | 2007-016914 A | 1/2007 |

* cited by examiner

*Primary Examiner* — Stacey Fluhart
(74) *Attorney, Agent, or Firm* — Andrews Kurth Kenyon LLP

(57) ABSTRACT

A selectable one-way clutch to selectively enable torque transmission only in one direction and to interrupt torque transmission in both directions is provided. The selectable one-way clutch comprises: an oil passage that is formed in the selector plate, and that has a first opening situated at a lower level than the oil level and a second opening situated at a higher level than the oil level; and a closure that is formed on the pocket plate at a position to close the second opening at least partially when the selectable one-way clutch is in the overrunning mode, and to increase the opening area of the second opening when the selectable one-way clutch is in the engagement mode.

4 Claims, 4 Drawing Sheets

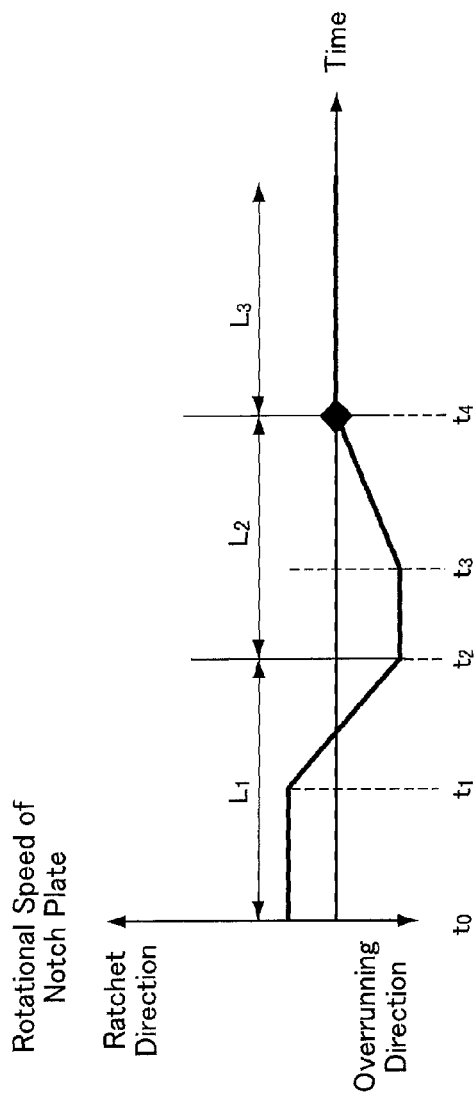

SELECTABLE ONE-WAY CLUTCH

The present invention claims the benefit of Japanese Patent Application No. 2015-049433 filed on Mar. 12, 2015 with the Japanese Patent Office, the disclosure of which is incorporated herein by reference in its entirety.

BACKGROUND

Field of the Invention

Preferred example relates to the art of a selectable one-way clutch adapted to selectively enable torque transmission only in one direction and to interrupt torque transmission in both directions.

Discussion of the Related Art

A selectable one-way clutch is brought into engagement mode by bringing struts held on a pocket plate into engagement with notches formed in a notch plate, and into disengagement mode by rotating a selector plate interposed between the pocket plate and the notch plate in such a manner to push the struts into the pocket of the pocket plate. In the prior art, lubrication device for the selectable one-way clutch have been proposed to prevent malfunction caused by friction acting between the rotary plates.

For example, JP-A-2003-021220 describes a device for delivering oil between a notch plate and a stator. To this end, according to the teachings of JP-A-2003-021220, the stator is provided with a recess formed on a pocket of a stator body, and oil passages connected to the recess.

JP-A-2007-016914 also describes a lubricating structure for a one-way clutch adapted to deliver oil to a roller selectively providing engagement between an inner race and an outer race so as to limit damage of the roller. According to the teachings of JP-A-2007-016914, specifically, oil is delivered to the roller through a lubrication passage extending in the inner race obliquely with respect to a rotational axis of the inner race, and with respect to a rotational axis of the roller as seen from an outer circumference side of the inner race.

In the conventional selectable one-way clutches, lubrication oil remaining in a lower section is sprinkled to the rotary members by the notch plate. In the selectable one-way clutches thus structured, however, struts of the lower section may be delayed to be pushed up by viscosity of the oil remaining in the lower section. In the conventional selectable one-way clutches, therefore, only the strut in an upper section of the selectable one-way clutch that is not soaked in the oil would be brought into engagement with the notch, and hence the strut thus brought into engagement with the notch earlier than the other struts and notches may be subjected to an engagement load excessively.

SUMMARY OF THE INVENTION

Aspects of preferred example has been conceived noting the foregoing technical problems, and it is therefore an object of the preferred embodiment is to provide a selectable one-way clutch that can be smoothly brought into engagement mode by preventing an engagement delay of the strut soaked in oil.

Preferred example relates to a selectable one-way clutch that is placed in such a manner that a rotational center axis thereof is leveled, comprising: a pocket plate having a disc portion and a cylindrical portion formed around the disc portion; a plurality of struts held in pockets formed on the disc portion of the pocket plate in a pivotal manner to project from the pockets and withdrawn into the pockets; a notch plate arranged coaxially with the pocket plate while being opposed thereto; a plurality of notches formed on the notch plate to which a leading end of each of the strut is individually brought into engagement when the notch plate is rotated in a forward direction, and from which the leading end of each of the strut is individually brought into disengagement when the notch plate is rotated in a backward direction; a selector plate that is interposed between the pocket plate and the notch plate in such a manner to be rotated to a first position at which the leading ends of the struts are allowed to protrude from the pockets toward the notches, and to a second position at which the struts are withdrawn into the pockets; and an oil remaining in a lower section of the selectable one-way clutch. In order to achieve the above-explained objective, the selectable one-way clutch according to the preferred example is provided with an oil passage that is formed in the selector plate, and that has a first opening situated at a lower level than a level of the oil and a second opening situated at a higher level than the level of the oil; and a closure that is formed on the pocket plate at a position to close the second opening of the oil passage at least partially to reduce an opening area when the selector plate is rotated to the second position, and to increase the opening area of the second opening of the oil passage when the selector plate is rotated to the first position.

The selectable one-way clutch according to the preferred example is provided with an outlet that is formed in the pocket plate to discharge the oil flowing out of the second opening to outside of the pocket plate.

Specifically, the struts are arranged symmetrically across a center axis of the pocket plate.

Thus, according to the preferred example, the first opening of the oil passage is situated at the lower level than the oil level, and the second opening of the oil passage is situated at the higher level than the oil level. According to the preferred example, therefore, the oil is introduced into the oil passage by a rotation of the notch plate and discharged from the second opening. Consequently, the oil level is lowered so that the lower strut is allowed to be pushed up smoothly without being effected by the viscosity of the oil to prevent uneven engagement of the selectable one-way clutch. Specifically, when the selector plate is rotated to the first position at which the leading end of each of the strut is individually allowed to protrude from the pocket toward the notch, the second opening is closed by the closure. In this case, therefore, the oil will not be discharged to outside and the oil level will not be lowered so that the selectable one-way clutch can be lubricated sufficiently. By contrast, when the selector plate is rotated to the second position at which the struts are withdrawn into the pockets, the closure is displaced to open the second opening. In this case, therefore, the oil is allowed to be discharged to outside to lower the oil level.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 4*a* is a graph indicating a change in rotational direction of the notch plate during bringing the selectable one-way clutch into engagement mode; and FIG. 4*b* is a table indicating statuses of the constituent elements of the selectable one-way clutch in both positions of the selector plate.

DETAILED DESCRIPTION OF THE PREFERRED EMBODIMENT(S)

Figure 1:
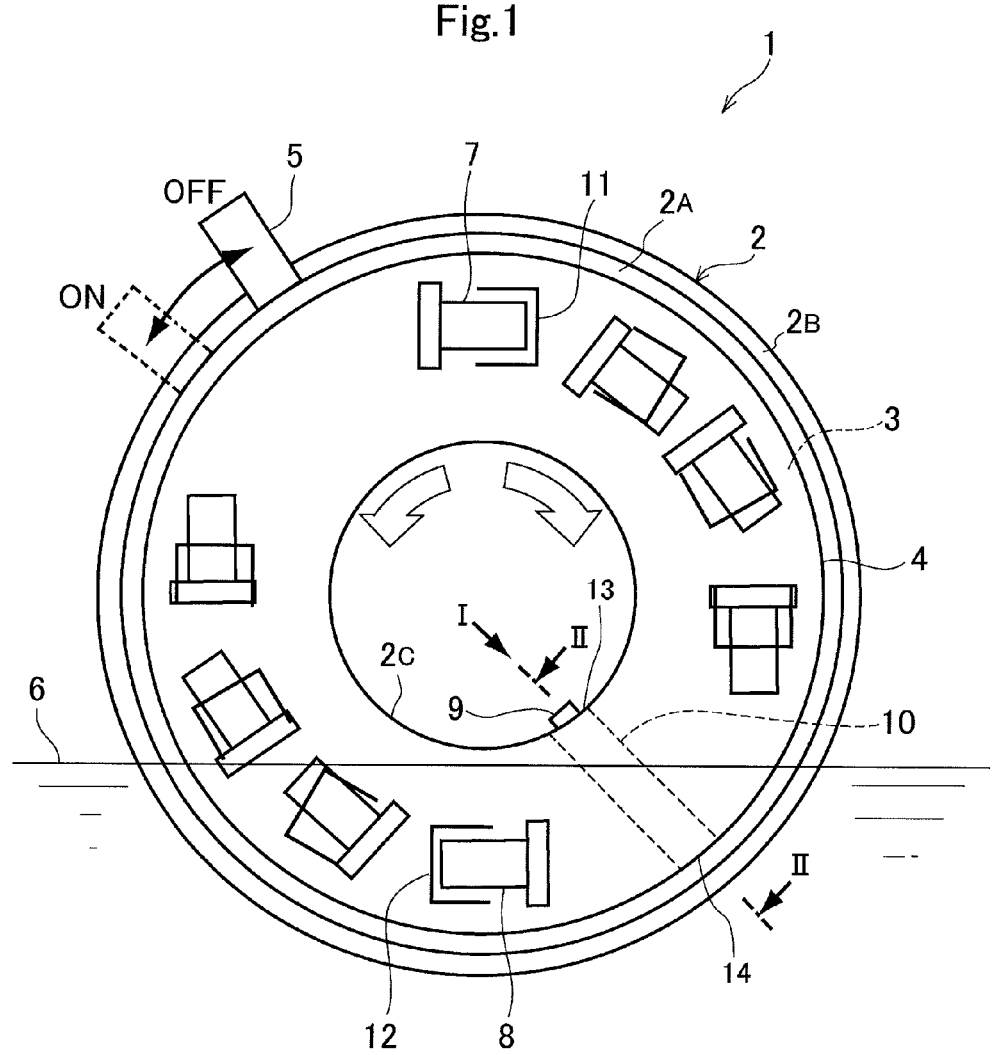
FIG. 1 is a schematic illustration showing a structure of the selectable one-way clutch according to the preferred example.

A preferred example of the present invention will now be explained with reference to the accompanying drawings. Referring now to FIG. 1, there is shown a front view of a selectable one-way clutch (to be abbreviated as "SOWC" hereinafter) 1 according to the preferred example. The SOWC 1 comprises a pocket plate 2, a notch plate 4 arranged coaxially with the pocket plate 2, and a selector plate 3 arranged between those plates 2 and 4. The selector plate 3 is provided with a protrusion 5 connected to an actuator (not shown) adapted to apply a pushing or pulling force to the protrusion 5 of the selector plate 3 along a tangential line of the selector plate 3. Specifically, the protrusion 5 of the selector plate 3 is rotated by the actuator to an engagement position at which the SOWC 1 is brought into an engagement mode to enable torque transmission in one of the rotational directions, and to an overrunning position at which the SOWC 1 is brought into an overrunning mode to interrupt torque transmission in both rotational directions. The SOWC 1 thus structured is horizontally placed and hence lubrication oil 6 remains in a lower section of the SOWC 1.

The pocket plate 2 comprises a disc portion 2A and an outer cylinder 2B formed around the disc portion 2B, and the selector plate 3 and the notch plate 4 are coaxially held in the outer cylinder 2B. The pocket plate 2 further comprises a plurality of pockets arranged symmetrically in a circular manner, and upper struts 7 and lower struts 8 are individually held in each pocket in a pivotal manner.

Specifically, each strut 7, 8 is individually shaped into a rectangular piece, and allowed to pivot around one of longitudinal ends thereof as a fulcrum to protrude other end (as will be called the "leading end" hereinafter) toward the notch plate 4, and to withdraw the other end into the pocket of the pocket plate 2. In order to push up the leading end of the strut 7, 8 toward the notch plate 4, a spring (not shown) is individually interposed between a bottom face of each pocket of the pocket plate 2 and a bottom face of the leading end of the strut 7, 8.

Figure 2A:
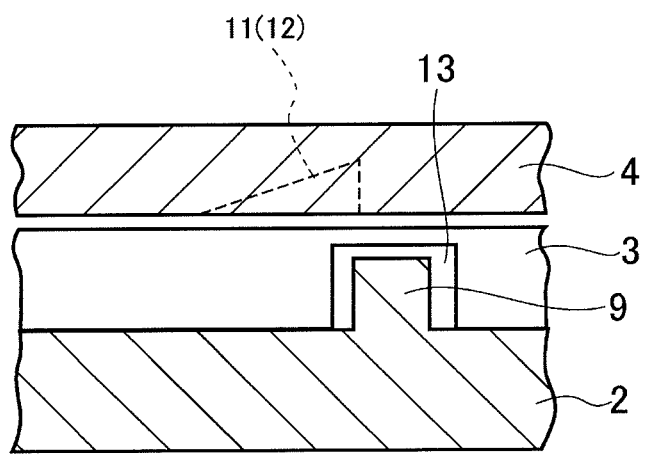
FIG. 2a is a partial cross-sectional view showing a cross-section of the selectable one-way clutch in disengagement mode viewed from the arrow I shown in FIG. 1.
Figure 2B:
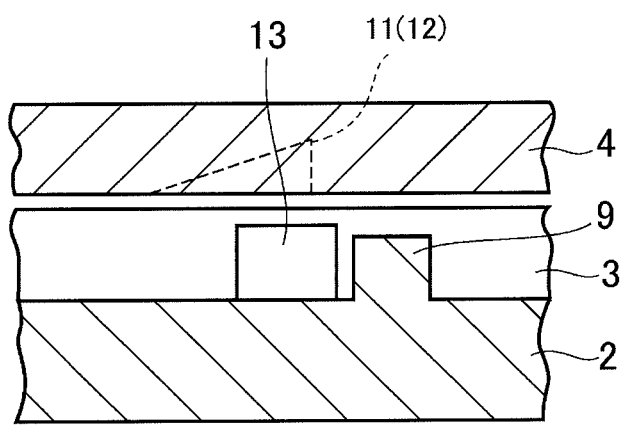
FIG. 2*b* is a partial cross-sectional view showing a cross-section of the selectable one-way clutch in engagement mode viewed from the arrow I shown in FIG. 1.

As illustrated in FIGS. 1 and 2, the pocket plate 2 is provided with a closure 9 protruding in an axial direction toward the selector plate 3 that is formed on an inner circumferential edge to selectively open and close an aftermentioned oil passage 10 depending on a position of the selector plate 3.

The selector plate 3 as a disc plate member is interposed between the pocket plate 2 and the notch plate 4 in a rotatable manner. A plurality of apertures (not shown) are also formed on the selector plate 3 at radially same level and in the same number as the pockets of the pocket plate 2 holding the struts 7 and 8.

The notch plate 4 is connected to a rotary shaft (not shown), and upper notches 11 and lower notches 12 are formed on a face of the notch plate 4 facing to the pocket plate 2 at radially same level and in the same number as the pockets of the pocket plate 2.

In the SOWC 1 thus structured, when the selector plate 3 is rotated by the actuator to the engagement position (indicated as "ON" in FIG. 1), the apertures of the selector plate 3 are overlapped with the pockets of the pocket plate 2 so that the leading ends of the struts 7 and 8 are allowed to be pushed up by the springs to enter into the notches 11 and 12 notched plate 4 through the apertures of the selector plate 3. In this situation, if the notch plate 4 is rotated counterclockwise (i.e., ratchet direction) in FIG. 1, the leading ends of the struts 7 and 8 are individually brought into abutment to engagement walls of the notches 11 and 12 so that the SOWC 1 is brought into engagement mode in which torque of the notch plate 4 is transmitted to the pocket plate 2. In this case, optionally, the SOWC 1 may be used as a brake by halting the pocket plate 2 to stop rotation of the notch plate 4.

By contrast, when the selector plate 3 is rotated by the actuator to the overrunning position (indicated as "OFF" in FIG. 1), the apertures of the selector plate 3 are displaced from the pockets of the pocket plate 2 so that the leading ends of the struts 7 and 8 are pushed into the pockets of the pocket plate 2 by the edges of the apertures of the selector plate 3 against the springs. Consequently, the SOWC 1 is brought into overrunning mode in which the notch plate 4 is allowed to rotate in both clockwise (i.e., overrunning direction) and counterclockwise directions.

Figure 3A:
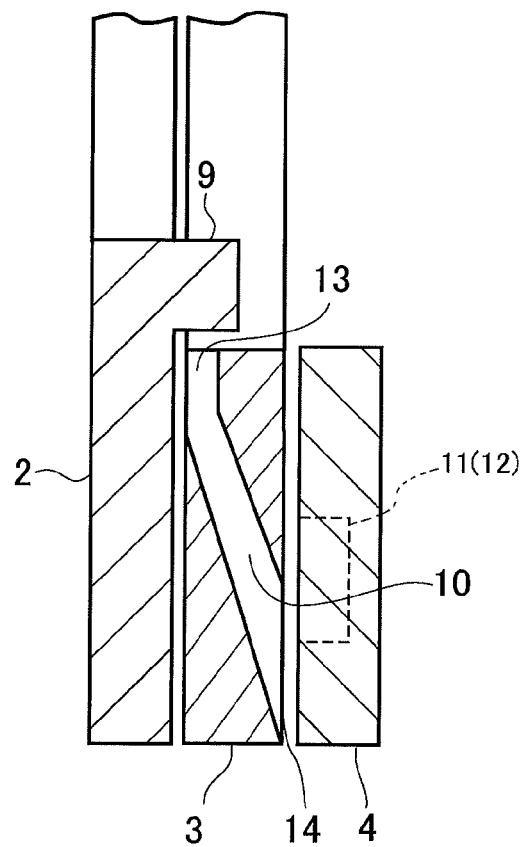
FIG. 3*a* is a partial cross-sectional view showing a cross-section of the selectable one-way clutch in disengagement mode along II-II line shown in FIG. 1.
Figure 3B:
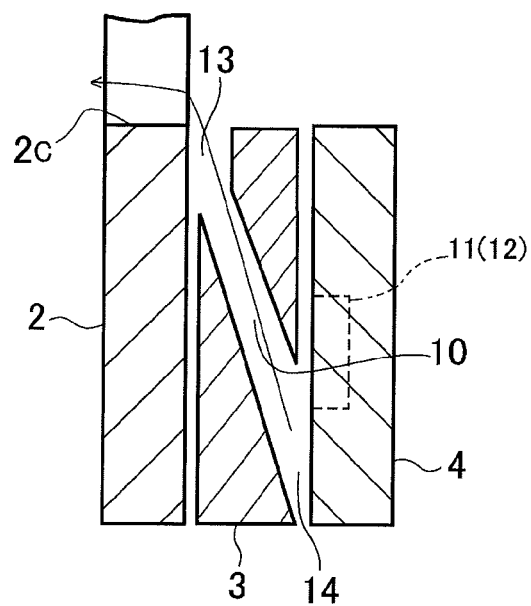
FIG. 3*b* is a partial cross-sectional view showing a cross-section of the selectable one-way clutch in engagement mode along II-II line shown in FIG. 1.

As illustrated in FIGS. 1 and 3, the selector plate 3 is further provided with the oil passage 10. In the oil passage 10, specifically, a first opening 14 is formed on an outer circumferential edge of the selector plate 3, and a second opening 13 is formed on an inner circumferential end of the selector plate 3. As illustrated in FIGS. 2 and 3, when the selector plate 3 is rotated to the overrunning position (indicated as "OFF" in FIG. 1), the second opening 13 of the oil passage 10 is closed at least partially by the closure 9 of the pocket plate 2. In other words, an opening area of the second opening 13 of the oil passage 10 is reduced by the closure 9 of the pocket plate 2. By contrast, when the selector plate 3 is rotated to the engagement position (indicated as "ON" in FIG. 1), the second opening 13 of the oil passage 10 is displaced from the closure 9 of the pocket plate 2. That is, the opening area of the second opening 13 of the oil passage 10 is increased, or the second opening 13 of the oil passage 10 is fully opened.

According to the preferred example, the oil passage 10 is formed downwardly toward right side in FIG. 1 in such a manner that the first opening 14 is situated below the surface level of the oil 6. In other words, the first opening 14 is situated in the downstream side of the second opening 13 in the overrunning direction (i.e., in the counterclockwise direction). In the SOWC 1, therefore, the oil 6 may be introduced smoothly into the oil passage 10 from the second opening 14 by rotating the notch plate 4 in the overrunning direction. In addition, as depicted in FIG. 3, the first opening 14 is opened toward the notch plate 4, while the second opening 13 is opened toward the pocket plate 2. That is, the oil passage 10 penetrates through the selector plate 3 obliquely in the thickness direction of the selector plate 3. Specifically, the pocket plate 2 is further provided with a through hole 2C as an outlet formed at a center of the disc portion 2A, and the second opening 13 is opened toward the through hole 2C.

Since the oil passage 10 is thus formed in an inclined manner, the oil 6 introduced into the oil passage 10 from the first opening 14 by rotating the notch plate 4 in the overrunning direction is allowed to flow smoothly toward the second opening 13. For this reason, the oil 6 is allowed to be discharged easily from the through hole 2C via the second opening 13 of the oil passage 10.

Turning to FIG. 4, there are shown an action of the SOWC 1 and a status of the oil 6. Specifically, FIG. 4 shows a situation in which a rotational direction of the notch plate 4 is changed from the ratchet direction (i.e., the forward direction) to the overrunning direction (i.e., the backward direction) under the condition that the selector plate 3 is situated at the overrunning position, and then the SOWC 1 is brought into the engagement mode by bringing the struts 7 and 8 into engagement with the notches 11 and 12 while reducing the rotational speed of the notch plate 4. In FIG. 4 (a), "L1" represents a first period (i.e., length of time) in which the selector plate is situated at the overrunning position, "L2" represents a second period in which the selector plate 3 is rotated to the engagement position but torque of the notch plate 4 has not yet been transmitted to the pocket plate 2, and "L3" represents a third period in which the selector plate 3 is situated at the engagement position and the torque of the notch plate 4 is transmitted to the pocket plate 2.

In the situation shown in FIG. 4 (a), the notch plate 4 is rotated in the ratchet direction before point t0, and a predetermined command signal is transmitted from an electronic control unit to the SOWC 1 at point t0. Consequently, reduction in a rotational speed of the notch plate 4 is commenced at point t1, and eventually starts rotating in the overrunning direction. Then, when the rotational speed of the notch plate 4 in the overrunning direction reaches a predetermined level, the selector plate 3 is rotated to the engagement position at point t2. Here, during the first period L1, the second opening 13 of the oil passage 10 is closed by the closure 9, or the opening area of the second opening 13 is reduced by the closure 9. In this situation, therefore, discharge of the oil 6 from the second opening 13 to outside of the SOWC 1 through the through hole 2C is restricted.

In the second period L2, the rotational speed of the notch plate 4 in the overrunning direction is maintained to the predetermined level until point t3, and then gradually reduced to be stopped at point t4. In this situation, the selector plate 3 is rotated to the engagement position so that the closure 9 of the selector plate 3 is displaced to open the second opening 13 of the oil passage 10. Consequently, as indicated in FIG. 4 (b), the oil 6 is the SOWC 1 is agitated by the rotation of the notch plate 4 so that centrifugally sprinkled from the first opening 14 toward the second opening 13.

After the rotation of the notch plate 4 is stopped, in the third period L3, the struts 7 and 8 are pushed up by the springs to be brought into engagement with the notches 11 and 12. In this situation, as indicated by the arrow in FIG. 3 (b), the oil 6 is discharged to the outside of the SOWC 1 through the oil passage 10 thus opened and hence the surface level of the oil 6 is lowered to be lower than the lower strut 8. Consequently, the lower strut 8 is allowed to be pushed up by the spring toward the notch 12 of the notch plate 4 without being effected by the viscosity of the oil 6. Here, since the oil passage 10 is formed in an inclined manner, the oil 6 will not be discharged in a significant amount under the condition that the selector plate 3 is situated at the engagement position and that the notch plate 4 is rotated in the ratchet direction.

Thus, according to the preferred example, the second opening 13 of inner circumferential side of the oil passage 10 is selectively opened and closed by the closure 9 of the pocket late 2. Specifically, in the overrunning mode in which the notch plate 4 is allowed to rotate in both directions, the second opening 13 is closed by the closure 9. In this case, therefore, the oil 6 will not be discharged to outside of the SOWC 1 in the so that the SOWC 1 can be lubricated sufficiently. By contrast, in case of bringing the SOWC 1 into the engagement mode, the closure 9 is displaced to open the second opening 13. In this case, therefore, the oil 6 is allowed to be discharged to outside of the SOWC 1 and hence the oil level in the SOWC 1 is lowered. Consequently, the lower strut 8 is allowed to be pushed up smoothly without being effected by the viscosity of the oil 6 to prevent uneven engagement of the SOWC 1.

It will be apparent to those skilled in the art that various modifications and variations may be made to the disclosed selectable one-way clutch within the spirit of the present invention. For example, a location of the first opening 14 of the oil passage 10 may be altered arbitrarily within a range under the oil level. In addition, the oil passage 10 may be formed in a curved manner. Further, the oil passage 10 may be formed in such a manner to discharge the oil introduced therein by agitating the oil by the notches 10 and 11.

What is claimed is:

1. A selectable one-way clutch that is placed in such a manner that a rotational center axis thereof is leveled, comprising:
    a pocket plate having a disc portion and a cylindrical portion formed around the disc portion;
    a plurality of struts held in pockets formed on the disc portion of the pocket plate in a pivotal manner to project from the pockets and withdrawn into the pockets;
    a notch plate arranged coaxially with the pocket plate while being opposed thereto;
    a plurality of notches formed on the notch plate to which a leading end of each of the strut is individually brought into engagement when the notch plate is rotated in a forward direction, and from which the leading end of each of the strut is individually brought into disengagement when the notch plate is rotated in a backward direction;
    a selector plate that is interposed between the pocket plate and the notch plate in such a manner to be rotated to a first position at which the leading ends of the strut are allowed to protrude from the pockets toward the notches, and to a second position at which the struts are withdrawn into the pockets;
    an oil passage that is formed in the selector plate, and that has a first opening provided radially further from the rotational center axis of the selector plate than a second opening; and
    a closure that is formed on the pocket plate at a position to close the second opening of the oil passage at least partially to reduce an opening area when the selector plate is rotated to the second position, and to increase the opening area of the second opening of the oil passage when the selector plate is rotated to the first position, wherein a surface area of the closure is not greater than the opening area of the second opening when the opening area of the second opening is not reduced by the closure.

2. The selectable one-way clutch as claimed in claim 1, further comprising:
an outlet provided in the pocket plate to discharge the oil flowing out of the second opening to outside of the pocket plate.

3. The selectable one-way clutch as claimed in claim 1, wherein the struts are arranged symmetrically across a center axis of the pocket plate.

4. A selectable one-way clutch that is placed in such a manner that a rotational center axis thereof is leveled, comprising:
a pocket plate having a disc portion and a cylindrical portion formed around the disc portion;
a plurality of struts held in pockets formed on the disc portion of the pocket plate in a pivotal manner to project from the pockets and withdrawn into the pockets;
a notch plate arranged coaxially with the pocket plate while being opposed thereto;
a plurality of notches formed on the notch plate to which a leading end of each of the strut is individually brought into engagement when the notch plate is rotated in a forward direction, and from which the leading end of each of the strut is individually brought into disengagement when the notch plate is rotated in a backward direction;
a selector plate that is interposed between the pocket plate and the notch plate in such a manner to be rotated to a first position at which the leading ends of the strut are allowed to protrude from the pockets toward the notches, and to a second position at which the struts are withdrawn into the pockets;
an oil passage that is formed in the selector plate, and that has a first opening provided radially further from the rotational center axis of the selector plate than a second opening; and
a closure that is formed on the pocket plate at a position to close the second opening of the oil passage at least partially to reduce an opening area when the selector plate is rotated to the second position, and to increase the opening area of the second opening of the oil passage when the selector plate is rotated to the first position,
wherein the oil passage is at an acute angle with respect to the rotational center axis of the selector plate.

* * * * *